United States Patent
Edelmann et al.

(10) Patent No.: US 6,770,327 B2
(45) Date of Patent: Aug. 3, 2004

(54) AMINOALKYLALKOXYSILOXANE MIXTURES

(75) Inventors: Roland Edelmann, Wehr (DE); Helmut Mack, Rheinfelden (DE); Nicole Poltsch, Weil am Rhein (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/271,550

(22) Filed: Oct. 17, 2002

(65) Prior Publication Data

US 2003/0072873 A1 Apr. 17, 2003

(30) Foreign Application Priority Data

Oct. 17, 2001 (DE) .......................................... 101 51 264

(51) Int. Cl.$^7$ ................................................ B05D 3/00
(52) U.S. Cl. .................... 427/387; 106/287.11; 528/34; 528/38
(58) Field of Search .............................. 528/38, 34, 10; 106/287.11; 427/387

(56) References Cited

U.S. PATENT DOCUMENTS

| | | | |
|---|---|---|---|
| 4,624,971 A | 11/1986 | van Tao et al. | |
| 5,282,998 A | 2/1994 | Horn et al. | |
| 5,679,147 A | * 10/1997 | Standke et al. | ........ 106/287.11 |
| 5,808,125 A | 9/1998 | Standke et al. | |
| 5,849,942 A | 12/1998 | Standke et al. | |
| 5,863,509 A | 1/1999 | Standke et al. | |
| 5,885,341 A | 3/1999 | Standke et al. | |
| 5,932,757 A | 8/1999 | Standke et al. | |
| 6,054,601 A | 4/2000 | Standke et al. | |
| 6,100,418 A | 8/2000 | Standke et al. | |
| 6,133,466 A | 10/2000 | Edelmann et al. | |
| 6,177,584 B1 | 1/2001 | Loewenberg et al. | |
| 6,228,936 B1 | 5/2001 | Standke et al. | |
| 6,239,194 B1 | 5/2001 | Standke et al. | |
| 6,251,989 B1 | 6/2001 | Edelmann et al. | |
| 6,255,513 B1 | 7/2001 | Standke et al. | |
| 6,288,256 B1 | 9/2001 | Standke et al. | |
| 6,361,871 B1 | 3/2002 | Jenkner et al. | |
| 6,395,858 B1 | 5/2002 | Mack et al. | |
| 6,403,228 B1 | 6/2002 | Mack et al. | |
| 6,500,883 B1 | 12/2002 | Mack et al. | |
| 6,528,585 B1 | 3/2003 | Standke et al. | |
| 6,534,667 B1 | 3/2003 | Standke et al. | |
| 2003/0153069 A1 * | 8/2003 | Seo et al. | ................ 435/287.2 |

FOREIGN PATENT DOCUMENTS

| | | |
|---|---|---|
| DE | 196 24 032 | 12/1997 |
| DE | 198 34 990 | 4/2000 |
| EP | 0 518 057 | 11/1991 |
| EP | 0 675 128 | 10/1995 |
| EP | 0 716 127 | 10/1995 |
| EP | 0 716 128 | 10/1995 |
| EP | 0 931 820 | 7/1999 |
| EP | 0 997 469 | 5/2000 |
| JP | 07157490 A * | 6/1995 ............. C07F/7/10 |

* cited by examiner

*Primary Examiner*—Margaret G. Moore
*Assistant Examiner*—Marc S. Zimmer
(74) *Attorney, Agent, or Firm*—Oblon, Spivak, McClelland, Maier & Neustadt, PC

(57) ABSTRACT

A siloxane mixture where the siloxanes carry aminoalkyl and alkoxy groups and, where appropriate, hydrocarbon groups and also where appropriate, hydroxyl groups.

25 Claims, No Drawings

AMINOALKYLALKOXYSILOXANE MIXTURES

BACKGROUND OF THE INVENTION

1. Field of the Invention

The present invention relates to a specific siloxane mixture wherein the siloxanes carry aminoalkyl and alkoxy groups and, where appropriate, alkyl groups and also where appropriate, hydroxyl groups and the mixture is obtainable by a particular process. The present invention further relates to the use of such mixtures and to compositions, i.e., formulations, coatings, articles, etc., which are based on the inventive mixture.

2. Description of the Background

Organofunctional silanes and also siloxanes are used, inter alia, to modify the properties of surfaces or as a reactive component in formulations, especially in coating compositions or in compounds.

Mixtures of linear and cyclic siloxane oligomers may be obtained by controlled hydrolysis and/or condensation of organofunctional alkoxysilanes. One particular problem associated with the preparation of polyfunctional siloxane oligomers is the extremely different hydrolysis and/or condensation behavior of the individual organoalkoxysilanes and organochlorosilanes. The activity of differently composed or differently prepared siloxane mixtures is also generally different.

EP 0 716 128 A2, EP 0 716 127 A2, and EP 0 675 128 A1 disclose aqueous solutions of amino-functional and OH-containing organosilanes and organosiloxanes. These organosilane systems are almost completely hydrolyzed and the organofunctional silicon units are in random distribution in the cocondensates.

EP 0 518 057 A1 and DE 196 24 032 A1 disclose mixtures of linear and cyclic vinyl-functional and also alkyl-functional siloxane oligomers which also carry alkoxy groups. Such mixtures are used, for example, to hydrophobicize mineral surfaces and pulverulent surfaces and also as crosslinking agents for thermoplastic polyolefins.

DE 198 34 990 discloses mixtures of linear and cyclic siloxane oligomers containing acryloyloxypropyl or methacryloyloxypropyl groups. Such siloxane oligomer mixtures may be used, for example, to treat mineral surfaces or the surfaces of pulverulent substances, such as titanium dioxide, talc, clay, silicas, quartz, kaolin, aluminum hydroxide, magnesium hydroxide, bentonite, montmorillonite, mica (muscovite mica), and calcium carbonate (chalk, dolomite). Said siloxane oligomer mixtures are also used as adhesion promoters in rubber compounds filled, for example, with kaolin.

EP 0 997 469 A2 discloses mixtures of linear and cyclic siloxane oligomers which carry aminopropyl, alkoxy, and, if desired, alkyl groups, the organofunctional silicon units in these cocondensates also being in random distribution.

SUMMARY OF THE INVENTION

It is an object of the present invention to provide additional organofunctional siloxane mixtures based on amino-functional Si compounds.

It has surprisingly been found that a novel mixture of aminoalkyl-, alkoxy-, where appropriate alkyl-, and, where appropriate, hydroxy-functional siloxanes can be prepared by subjecting (i) at least one tetraalkoxysilane or (ii) at least one hydrocarbon-alkoxysilane or (iii) a mixture of at least one tetraalkoxysilane and at least one hydrocarbon-alkoxysilane to partial hydrolysis and precondensation by addition of water and acid, thereafter adding at least one aminoalkyl-functional alkoxysilane to the resulting siloxane reaction mixture, with aminoalkylsilanes being condensed onto the siloxane units present in the reaction mixture and substantially enveloping them so that the aminoalkyl groups are oriented outward, and subsequently removing the alcohol from the system. In this way it is possible in an advantageous way to provide a novel amino-functional siloxane mixture.

Thus, the present invention provides a mixture of aminoalkyl-, alkoxy-, and, optionally, alkyl-, and, optionally, hydroxy-functional siloxanes, obtainable by a process comprising subjecting (i) at least one tetraalkoxysilane or (ii) at least one hydrocarbon-alkoxysilane or (iii) a mixture of at least one tetraalkoxysilane and at least one hydrocarbon-alkoxysilane to controlled hydrolysis and precondensation by addition of water and acid to produce a siloxane reaction mixture, followed by adding at least one aminoalkyl-functional alkoxysilane to the siloxane reaction mixture, and removing alcohol from the reaction mixture.

The present invention also provides a process for preparing a siloxane mixture described above, comprising subjecting (i) at least one tetraalkoxysilane or (ii) at least one alkylalkoxysilane or (iii) a mixture of at least one tetraalkoxysilane and at least one alkylalkoxysilane to controlled hydrolysis and precondensation by addition of water and acid, thereafter adding at least one aminoalkyl-functional alkoxysilane to the resulting siloxane reaction mixture, and removing alcohol from the reaction mixture.

The present invention additionally provides an organic resin composition, comprising an organic resin and the siloxane mixture described above.

In addition, the present invention provides a method of making the resin composition described above, comprising incorporating the siloxane mixture described above into the organic resin.

The present invention also provides a paint composition, comprising a paint and the siloxane mixture as described above.

In another embodiment, the present invention provides a method of making the paint composition described above, comprising incorporating the siloxane mixture described above into the paint.

The present invention also provides a varnish composition, comprising a varnish and the siloxane mixture described above.

The present invention additionally provides a method of making the varnish composition described above, comprising incorporating the siloxane mixture described above into the varnish.

The present invention also provides a method of treating a mineral, organic, or metallic surface, comprising applying the siloxane mixture described above to the surface.

In another embodiment, the present invention also provides a method of hydrophobicizing a surface, comprising applying the siloxane mixture described above to the surface.

The present invention also provides a method of surface-modifying a pulverulent substance, comprising treating the substance with the siloxane mixture described above.

Further, the present invention also provides a method of silanizing fillers and pigments, comprising treating a filler or a pigment with the siloxane mixture described above.

A more complete appreciation of the invention and many of the attendant advantages thereof will be readily obtained as the same becomes better understood by reference to the detailed description below.

DETAILED DESCRIPTION OF THE INVENTION

Inventive mixtures of aminoalkylalkoxy-functional siloxanes generally contain less than 5% by weight, preferably less than 2% by weight, of free alcohol and may be incorporated advantageously into resins, paints, and varnishes, so making it possible to improve in particular the adhesion on a hydrophilic substrate. Thus, the siloxanes of the invention may contain at most 0.01, 0.02, 0.05, 0.1, 0.2, 0.5, 1, or 1.5% by weight of free alcohol.

Inventive mixtures obtained in this way are usually homogeneous, clear, low-viscosity, storage-stable liquids which are colorless to pale yellow in color and possess preferably a flash point>55° C.

By means of the mode of preparation described above, it is possible in a simple and economic way to produce siloxanes of the invention, the siloxane units present in the mixture preferably possessing, as will be readily appreciated by those skilled in the art, a core of alkoxy-functional, where appropriate hydroxy-functional, and, where appropriate, alkyl-functional siloxane oligomers with substantially linear or cyclic crosslinking—for example, oligomeric tetraethoxysilanes, i.e., ethyl silicates such as in DYNASIL® 40—and, condensed thereon, aminoalkylsilane units enveloping the core, the aminoalkyl groups appropriately having an outward orientation. Mixtures of siloxanes of the invention preferably have an average molar mass of from 400 to 1,000 g/mol, with particular preference from 500 to 900 g/mol, with very particular preference from 600 to 800 g/mol.

The present invention accordingly provides a mixture of aminoalkyl-, alkoxy-, where appropriate alkyl-, and, where appropriate, hydroxy-functional siloxanes obtainable by subjecting (i) at least one tetraalkoxysilane or (ii) at least one hydrocarbon-alkoxysilane or (iii) a mixture of at least one tetraalkoxysilane and at least one hydrocarbon-alkoxysilane to controlled hydrolysis and precondensation by addition of water and acid, thereafter adding at least one aminoalkyl-functional alkoxysilane to the resulting siloxane reaction mixture, and removing alcohol from the system.

As the tetraalkoxysilane, it is preferred to use tetraethoxysilane or oligomeric tetraethoxysilane.

Furthermore, for the preparation of the inventive siloxane mixture, it is preferred as the hydrocarbon-alkoxysilane component to use alkylalkoxysilanes, such as methyltrimethoxysilane, methyltriethoxysilane, n-propyltrimethoxysilane or n-propyltriethoxysilane, or a mixture thereof, although phenylalkoxysilanes or vinylalkoxysilanes may also be used.

As component (ii) it is possible, for example, to use mixtures of methyltrimethoxysilane and propyltrimethoxysilane, of propyltrimethoxysilane and vinyltrimethoxysilane or phenyltrimethoxysilane and propyltrimethoxysilane, and of phenyltriethoxysilane and propyltriethoxysilane, to name but a few examples.

The nature of the acid is not particularly limited. As acid component use is preferably made of hydrogen chloride, appropriately aqueous hydrochloric acid, in the form, for example, of 37% strength HCl.

For the preparation of the inventive mixture use may be further made of at least one aminoalkyl-functional alkoxysilane which carries in particular an aminoalkyl group from the series consisting of aminoethylaminopropyl, aminoethylaminoethylaminopropyl, N-methylaminopropyl, N-(n-butyl)aminopropyl, N-cyclohexylaminopropyl, and N-phenylaminopropyl, and at least one alkoxy group from the series consisting of methoxy, ethoxy, and propoxy. Examples of such are 3-aminopropyltrialkoxysilanes, such as 3-aminopropyltrimethoxysilane, 3-aminopropyltriethoxysilane, N-aminoethyl-3-aminopropyltrialkoxysilanes, N-aminoethyl-N-aminoethyl-3-aminopropyltrialkoxysilanes, N-methyl-aminopropyltrialkoxysilanes, N-n-butyl-aminopropyltrialkoxysilanes, N-cyclohexyl-aminopropyltrialkoxysilanes, N-phenyl-aminopropyltrialkoxysilanes, 3-aminopropyl-methyldialkoxysilanes, N-aminoethyl-3-aminopropyl-methyldialkoxysilanes, N-aminoethyl-N-aminoethyl-3-aminopropyl-methyldialkoxysilanes, N-methyl-aminopropyl-methyldialkoxysilanes, N-n-butyl-aminopropyl-methyldialkoxysilanes, N-cyclohexyl-aminopropyl-methyldialkoxysilanes, and N-phenyl-aminopropyl-methyldialkoxysilanes, to name but a few examples.

For the preparation of the inventive siloxane mixture, component (i), (ii), and the aminoalkylalkoxysilane are used preferably in a molar ratio of from 3:0:1 to 1:1:0.5, with particular preference for 1:1:1.

Preferably, component (iii) comprises tetraalkoxysilanes and hydrocarbon-alkoxysilanes, especially tetraalkoxysilane and alkylalkoxysilane, in a molar ratio of from 1:1 to 1:0.5.

Furthermore, the reactants of the invention may also be used in solution in an alcohol, particularly in methanol or ethanol. Accordingly, the hydrolysis and precondensation of the components (i), (ii) or (iii) are suitably conducted in a solution diluted with alcohol, preferably methanol or ethanol. It is appropriate to use up to 60% by weight alcohol, preferably from 20 to 45% by weight alcohol, with particular preference from 30 to 40% by weight alcohol, based on components (i), (ii) or (iii).

For the preparation of the inventive siloxane mixture use is made for the hydrolysis and precondensation of preferably from 0.7 to 1.6 mol, with particular preference from 0.8 to 1.2 mol, with very particular preference from 0.85 to 1.0 mol, of water per mole of Si in components (i), (ii) or (iii).

For the hydrolysis and precondensation it is appropriate to use concentrated or aqueous hydrogen chloride solution, preferably 37% strength hydrochloric acid, in an amount of from 0.005 to 0.011% by weight HCl, preferably from 60 to 100 ppm by weight HCl, with particular preference from 70 to 90 ppm by weight HCl, based in each case on the amount of components (i), (ii) or (iii), and taking into account the water content of the hydrochloric acid.

The hydrolysis and precondensation are preferably conducted under atmospheric pressure at a temperature of from 10 to 95° C., with particular preference for from 1 to 2 hours at from 30 to 50° C., with very particular preference for 1 hour at around 40° C.

A preferred procedure in connection with the preparation of the inventive siloxane mixture is to add at least one aminoalkylalkoxysilane with thorough mixing to the reaction mixture following hydrolysis and precondensation at a temperature in the range from 30 to 80° C., preferably in the range from 35 to 75° C., and to allow the mixture to react over a period of from 5 minutes to 4 hours, in particular from 15 minutes to 2 hours, with very particular preference for 30 minutes at 40° C. and at a pH in the range from around 10 to 11, and subsequently to remove alcohol from the system by distillation at a temperature in the range from 40 to 120° C., preferably in the range from 60 to 100° C., with particular preference in the range from 80 to 100° C., under atmospheric pressure or under reduced pressure, preferably at from 500 to 100 mbar, the product obtained after distillative workup suitably containing less than 5% by weight, with particular preference less than 1% by weight, free alcohol.

The present invention accordingly also provides a process for preparing the siloxane mixture of the invention by subjecting at least one tetraalkoxysilane or at least one alkylalkoxysilane or a mixture of at least one tetraalkoxysilane and at least one alkylalkoxysilane to controlled hydrolysis and precondensation by addition of water and acid, thereafter adding at least one aminoalkyl-functional alkoxysilane to the resulting siloxane reaction mixture, and removing alcohol from the system.

In general, the process according to the invention is conducted as follows: It is possible to introduce components (i), (ii) or (iii) as an initial charge, in straight form or in solution in the corresponding alcohol, to carry out controlled addition of water and acid, and to conduct the partial hydrolysis and precondensation of the silanes for a certain time, with effective mixing and, where appropriate, heating of the reaction mixture. Subsequently, the aminoalkylalkoxysilane component is added to the reaction mixture and reaction is allowed to take place. It is then possible to remove the free alcohol used, and the free alcohol resulting from the hydrolysis and condensation, from the system under atmospheric pressure or reduced pressure, where appropriate with heating, with significantly less than 5% by weight free alcohol generally remaining in the product. It is also possible to filter the product and subject it to aftertreatment with activated carbon.

Inventive siloxane mixtures obtained in this way may be used with advantage—though not exclusively—in resins, paints and varnishes.

Accordingly, the present invention also provides paints, varnishes, and resins which comprise an inventive siloxane mixture, especially if such a system includes components which are able to react with an organic function of the siloxane.

The present invention likewise provides for the use of an inventive siloxane mixture for modifying and crosslinking organic resins, as a binder or adhesion promoter in paints and varnishes, for treating mineral, organic, and metallic surfaces, for hydrophobicizing surfaces, for surface-modifying pulverulent substances, and for silanizing fillers and pigments.

EXAMPLES

Having generally described this invention, a further understanding can be obtained by reference to certain specific examples which are provided herein for purposes of illustration only and are not intended to be limiting unless otherwise specified.

Example 1

Mixture of Methyltrimethoxysilane, Propyltrimethoxysilane and Aminopropyltrimethoxysilane A 2 l multineck flask equipped with stirrer, reflux condenser, thermometer and dropping funnel was charged with 340.5 g of methyltrimethoxysilane and 410.3 g of propyltrimethoxysilane. Over the course of from 40 to 50 minutes a mixture of 90.0 g of water, 300.3 g of methanol and 0.17 g of 37% strength hydrochloric acid was metered in with stirring at room temperature. A clear colorless liquid was obtained. The increase in temperature to 30–35° C. was an indication of the beginning of partial hydrolysis of the silanes. The temperature was set to 40° C. and the reaction mixture was stirred for about 1 hour more. Thereafter, a GC check indicated that the monomer content was <1 area percent, i.e., the silanes had undergone virtually complete conversion into oligomeric silanols and siloxanes, respectively. Then 447.5 g of aminopropyl-trimethoxysilane with a pH of 11 were added with stirring and a mixture of 45.0 g of water and 179.0 g of methanol was added dropwise from a dropping funnel over the course of 0.5 hour. Alkaline hydrolysis and condensation then took place. Stirring was continued at 40° C. for 0.5 hour more and the complete conversion of the silanes was checked by means of GC.

Then, at a still temperature of about 60 to 65° C. and a pressure of from 600 to 100 mbar, the alcohol used and the hydrolysis alcohol were distilled off over the course of 2.5 hours. As soon as distillate was no longer produced, the pressure was adjusted to <1 mbar and the still temperature was allowed to rise to a maximum of 90° C. The reaction mixture remained under these conditions for 1.5 hours more to give a product having a residual alcohol content of less than 2%.

The siloxane mixture was a clear colorless liquid with a viscosity of about 99 mPa s and had an average molar mass of approximately 540 g/mol.

Example 2

Mixture of Vinyltrimethoxysilane, Propyltrimethoxysilane and Aminopropyltrimethoxysilane A 1 l multineck flask equipped with stirrer, reflux condenser, thermometer and dropping funnel was charged with 148.1 g of vinyltrimethoxysilane and 164.1 g of propyltrimethoxysilane. Over the course of from 40 to 50 minutes a mixture of 28.8 g of water, 130.8 g of methanol and 0.09 g of 37% strength hydrochloric acid was metered in with stirring at room temperature. A clear colorless liquid was obtained. The increase in temperature to 30–35° C. was an indication of the beginning of partial hydrolysis of the silanes. The temperature was set to 62° C. and the reaction mixture was stirred for about 0.5 hour more. Thereafter, a GC check indicated that the monomer content was <1 area percent, i.e., the silanes had undergone virtually complete conversion into oligomeric silanols and siloxanes, respectively. Then 179.0 g of aminopropyl-trimethoxysilane with a pH of 11 were added with stirring and a mixture of 14.4 g of water and 71.6 g of methanol was added dropwise from a dropping funnel over the course of 0.5 hour. Alkaline hydrolysis and condensation then took place. Stirring was continued at 64° C. for 0.5 hour more and the complete conversion of the silanes was checked by means of GC.

Then, at a still temperature of about 60 to 65° C. and a pressure of from 600 to 100 mbar, the alcohol used and the hydrolysis alcohol were distilled off over the course of 2.5 hours. As soon as distillate was no longer produced, the pressure was adjusted to <1 mbar and the still temperature was allowed to rise to a maximum of 90° C. The reaction mixture remained under these conditions for 1.5 hours more to give a product having a residual alcohol content of less than 2%. The siloxane mixture was a clear colorless liquid with a viscosity of about 21 mPa s and had an average molar mass of approximately 490 g/mol.

Example 3

Mixture of Phenyltrimethoxysilane, Propyltrimethoxysilane and Aminopropyltrimethoxysilane A 1 l multineck flask equipped with stirrer, reflux condenser, thermometer and dropping funnel was charged with 198.3 g of phenyltrimethoxysilane and 164.1 g of propyltrimethoxysilane. Over the course of from 40 to 50 minutes a mixture of 28.8 g of water, 145.0 g of methanol and 0.11 g of 37% strength hydrochloric acid was metered in with stirring at room temperature. A clear colorless liquid was obtained. The increase in temperature to 30–35° C. was an indication of the beginning of partial hydrolysis of the silanes. The temperature was set to 35° C. and the reaction mixture was stirred for about 0.5 hour more. Thereafter, a GC check indicated that the monomer content was <1 area percent, i.e., the silanes had undergone virtually complete conversion into oligomeric silanols and siloxanes, respectively. Then 179.0 g of aminopropyl-trimethoxysilane with a pH of 11 were added with stirring and a mixture of 14.4 g of water and 71.6 g of methanol was added dropwise from a dropping funnel over the course of 0.5 hour. Alkaline hydrolysis and condensation then took place. Stirring was continued at 35° C. for 0.5 hour more and the complete conversion of the silanes was checked by means of GC.

Then, at a still temperature of about 60 to 65° C. and a pressure of from 600 to 100 mbar, the alcohol used and the hydrolysis alcohol were distilled off over the course of 2.5 hours. As soon as distillate was no longer produced, the pressure was adjusted to <1 mbar and the still temperature was allowed to rise to a maximum of 90° C. The reaction mixture remained under these conditions for 1.5 hours more to give a product having a residual alcohol content of less than 2%.

The siloxane mixture was a clear colorless liquid with a viscosity of about 34 mPa s and had an average molar mass of approximately 410 g/mol.

Example 4

Mixture of Methyltriethoxysilane, Propyltriethoxysilane and Aminopropyltrimethoxysilane A 2 l multineck flask equipped with stirrer, reflux condenser, thermometer and dropping funnel was charged with 267.4 g of methyltriethoxysilane and 309.2 g of propyltriethoxysilane. Over the course of from 40 to 50 minutes a mixture of 43.2 g of water, 230.7 g of ethanol and 0.55 g of 37% strength hydrochloric acid was metered in with stirring at a still temperature of 800° C. A clear colorless liquid was obtained. The temperature was set to 78° C. and the reaction mixture was stirred for about 2 hours more. Thereafter, a GC check indicated that the monomer content was <1 area percent, i.e., the silanes had undergone virtually complete conversion into oligomeric silanols and siloxanes, respectively. The reaction mixture was cooled to about 40° C. Then 268.5 g of aminopropyl-trimethoxysilane with a pH of 11 were added with stirring and a mixture of 21.6 g of water and 107.4 g of ethanol was added dropwise from a dropping funnel over the course of 0.5 hour. Alkaline hydrolysis and condensation then took place. Stirring was continued at 78° C. for 0.5 hour more and the complete conversion of the silanes was checked by means of GC.

Then, at a still temperature of about 60 to 65° C. and a pressure of from 600 to 100 mbar, the alcohol used and the hydrolysis alcohol were distilled off over the course of 2.5 hours. As soon as distillate was no longer produced, the pressure was adjusted to <1 mbar and the still temperature was allowed to rise to a maximum of 90° C. The reaction mixture remained under these conditions for 1.5 hours more to give a product having a residual alcohol content of less than 2%.

The siloxane mixture was a clear colorless liquid with a viscosity of about 9.6 mPa s and had an average molar mass of approximately 558 g/mol.

Example 5

Mixture of Propyltrimethoxysilane and N-(n-butyl)-2-aminopropyltrimethoxysilane A 1 l multineck flask equipped with stirrer, reflux condenser, thermometer and dropping funnel was charged with 164.1 g of propyltrimethoxysilane. Over the course of from 40 to 50 minutes a mixture of 14.4 g of water, 65.9 g of methanol and 0.05 g of 37% strength hydrochloric acid was metered in with stirring at room temperature. A clear colorless liquid was obtained. The increase in temperature to about 30° C. was an indication of the beginning of partial hydrolysis of the silane. The temperature was set to 30° C. and the reaction mixture was stirred for about 0.5 hour more. Thereafter, a GC check indicated that the monomer content was <1 area percent, i.e., the silane had undergone virtually complete conversion into oligomeric silanols and siloxanes, respectively. Then 236.0 g of butylaminopropyltrimethoxysilane were added with stirring and a mixture of 14.4 g of water and 94.4 g of methanol was added dropwise from a dropping funnel over the course of 0.5 hour. Alkaline hydrolysis and condensation then took place. Stirring was continued at 64° C. for 1.5 hours more and the complete conversion of the silanes was checked by means of GC.

Then, at a still temperature of about 60 to 65° C. and a pressure of from 600 to 100 mbar, the alcohol used and the hydrolysis alcohol were distilled off over the course of 2.5 hours. As soon as distillate was no longer produced, the pressure was adjusted to <1 mbar and the still temperature was allowed to rise to a maximum of 90° C. The reaction mixture remained under these conditions for 1.5 hours more to give a product having a residual alcohol content of less than 2%.

The siloxane mixture was a turbid pale yellow liquid with a viscosity of about 16 mPa s and had an average molar mass of approximately 440 g/mol. It was subsequently filtered. After that, the mixture was clear and pale yellow.

Example 6

Mixture of Methyltrimethoxysilane, Propyltrimethoxysilane and N-aminoethyl-3-aminopropyltriethoxysilane A 1 l multineck flask equipped with stirrer, reflux condenser, thermometer and dropping funnel was charged with 136.2 g of methyltrimethoxysilane and 164.1 g of propyltrimethoxysilane. Over the course of from 40 to 50 minutes a mixture of 28.8 g of water, 120.1 g of methanol and 0.07 g of 37% strength hydrochloric acid was metered in with stirring at room temperature. A clear colorless liquid was obtained. The increase in temperature to 30–39° C. was an indication of the beginning of partial hydrolysis of the silanes. The temperature was set to 40° C. and the reaction mixture was stirred for about 1 hour more. Thereafter, a GC check indicated that the monomer content was <1 area percent, i.e., the silanes had undergone virtually complete conversion into oligomeric silanols and siloxanes, respectively. Then 222.0 g of aminoethyl-3-aminopropyltrimethoxysilane with a pH of 11 were added with stirring and a mixture of 14.4 g of water and 88.8 g of methanol was added dropwise from a dropping funnel over the course of 0.5 hour. Alkaline hydrolysis and condensation then took place. Stirring was continued at 40° C. for 0.5 hour more and the complete conversion of the silanes was checked by means of GC.

Then, at a still temperature of about 60 to 65° C. and a pressure of from 600 to 100 mbar, the alcohol used and the hydrolysis alcohol were distilled off over the course of 2.5 hours. As soon as distillate was no longer produced, the pressure was adjusted to <1 mbar and the still temperature was allowed to rise to a maximum of 90° C. The reaction mixture remained under these conditions for 1.5 hours more to give a product having a residual alcohol content of less than 2%.

The siloxane mixture was a clear colorless liquid with a viscosity of about 560 mPa s and had an average molar mass of approximately 675 g/mol.

Example 7

Mixture of Tetraethoxysilane, Propyltriethoxysilane and Aminopropyltrimethoxysilane A 1 l multineck flask equipped with stirrer, reflux condenser, thermometer and dropping funnel was charged with 208.3 g of tetraethoxysilane and 206.1 g of propyltriethoxysilane. The temperature was set at 70° C. Over the course of from 40 to 50 minutes a mixture of 28.8 g of water, 165.8 g of ethanol and 0.11 g of 37% strength hydrochloric acid was metered in with stirring. A turbid colorless liquid was obtained. The temperature was set to 78° C. and the reaction mixture was stirred for about 2.5 hours more. Thereafter, a GC check indicated that the monomer content was <1 area percent, i.e., the silanes had undergone virtually complete conversion into oligomeric silanols and siloxanes, respectively. Then 89.5 g of aminopropyl-trimethoxysilane with a pH of 11 were added with stirring and a mixture of 7.2 g of water and 35.8 g of ethanol was added dropwise from a dropping funnel over the course of 0.5 hour. Alkaline hydrolysis and condensation then took place. Stirring was continued at 78° C. for 1.5 hours more and the complete conversion of the silanes was checked by means of GC.

Then, at a still temperature of about 60 to 65° C. and a pressure of from 600 to 100 mbar, the alcohol used and the hydrolysis alcohol were distilled off over the course of 2.5 hours. As soon as distillate was no longer produced, the pressure was adjusted to <1 mbar and the still temperature was allowed to rise to a maximum of 90° C. The reaction mixture remained under these conditions for 1.5 hours more to give a product having a residual alcohol content of less than 2%.

The siloxane mixture was a turbid colorless liquid with a viscosity of about 8.3 mPa s and had an average molar mass of approximately 563 g/mol. It was subsequently filtered. After that, the mixture was clear and colorless.

Example 8

Mixture of Oligomeric Tetraethoxysilane and Aminopropyltrimethoxysilane

A 2 l multineck flask equipped with stirrer, reflux condenser, thermometer and dropping funnel was charged with 1 144.4 g of oligomeric tetraethoxysilane (trade name DYNASIL® 40). The temperature was set at 75° C. Over the course of from 40 to 50 minutes a mixture of 34.6 g of water, 343.4 g of ethanol and 0.4 g of 37% strength hydrochloric acid was metered in with stirring. A slightly turbid colorless liquid was obtained. The temperature was set to 78° C. and the reaction mixture was stirred for about 2.5 hours. Thereafter, a GC check indicated that the monomer content was <1 area percent, i.e., the oligomeric tetraethoxysilane had undergone virtually complete conversion into oligomeric silanol and siloxane, respectively. Then 143.2 g of aminopropyl-trimethoxysilane with a pH of 11 were added with stirring and a mixture of 11.6 g of water and 43.0 g of ethanol was added dropwise from a dropping funnel over the course of 0.5 hour. Alkaline hydrolysis and condensation then took place. Stirring was continued at 78° C. for 0.5 hour more and the complete conversion of the silanes was checked by means of GC.

Then, at a still temperature of about 60 to 65° C. and a pressure of from 600 to 100 mbar, the alcohol used and the hydrolysis alcohol were distilled off over the course of 2.5 hours. As soon as distillate was no longer produced, the pressure was adjusted to <1 mbar and the still temperature was allowed to rise to a maximum of 90° C. The reaction mixture remained under these conditions for 1.5 hours more to give a product having a residual alcohol content of less than 2%.

The siloxane mixture was a clear colorless liquid with a viscosity of about 42 mPa s and had an average molar mass of approximately 930 g/mol.

Comparative Example

Mixture of Methyltriethoxysilane, Propyltriethoxysilane and Aminopropyltrimethoxysilane without Catalyst A 1 l multineck flask equipped with stirrer, reflux condenser, thermometer and dropping funnel was charged with 178.3 g of methyltriethoxysilane and 206.1 g of propyltriethoxysilane. The temperature was set at 80° C. Over the course of from 40 to 50 minutes a mixture of 28.8 g of water and 153.8 g of ethanol was metered in with stirring. A clear colorless liquid was obtained. The temperature was set to 78° C. and the reaction mixture was stirred for about 5 hours more. Thereafter, a GC check indicated a fraction of monomeric silanes of about 16.4 area percent; i.e., since no hydrolysis catalyst was used, only a small portion of the silanes were in hydrolyzed form. Then 208.3 g of aminopropyl-trimethoxysilane with a pH of 11 were added with stirring and a mixture of 14.4 g of water and 83.3 g of ethanol was added dropwise from a dropping funnel over the course of 0.5 hour. Alkaline hydrolysis and condensation then took place. Stirring was continued at 78° C. for 3 hours more and the complete conversion of the silanes was checked by means of GC. The aminopropyltrimethoxysilane was fully consumed by reaction, while 57.8 area percent of propyltriethoxysilane and 5.5 area percent of methyltriethoxysilane were still present.

Then, at a still temperature of about 60 to 65° C. and a pressure of from 600 to 100 mbar, the alcohol used and the hydrolysis alcohol were distilled off over the course of 2.5 hours. As soon as distillate was no longer produced, the pressure was adjusted to <1 mbar and the still temperature was allowed to rise to a maximum of 90° C. The reaction mixture remained under these conditions for 1.5 hours more to give a product having a residual alcohol content of less than 2%.

The siloxane mixture was a clear colorless liquid with a viscosity of about 10 mPa s and had an average molar mass of approximately 298 g/mol.

Obviously, numerous modifications and variations of the present invention are possible in light of the above teachings. It is therefore to be understood that within the scope of the appended claims, the invention may be practiced otherwise than as specifically described herein.

This application is based on German Patent Application Serial No. 101 51 264.3, filed on Oct. 17, 2001 and incorporated herein by reference.

What is claimed is:

1. A mixture of aminoalkyl-, alkoxy-, and, optionally, alkyl-, and, optionally, hydroxy-functional siloxanes, obtainable by a process comprising subjecting (i) at least one tetraalkoxysilane and (ii) at least one hydrocarbon-alkoxysilane to controlled hydrolysis and precondensation by addition of water and acid to produce a siloxane reaction mixture, followed by adding at least one aminoalkyl-functional alkoxysilane to the siloxane reaction mixture, and removing alcohol from the reaction mixture, wherein (i), (ii) and the aminoalkyl-functional alkoxysilane are used in a molar ratio of from 3:0:1 to 1:1:0.5, thereby forming a siloxane mixture.

2. The mixture as claimed in claim 1, wherein the siloxanes have an average molar mass of from 400 to 1,000.

3. The mixture as claimed in claim 1, wherein the at least one tetraalkoxysilane comprises tetraethoxysilane.

4. The mixture as claimed in claim 1, wherein the at least one hydrocarbon-alkoxysilane comprises methyltrimethoxysilane, methyltriethoxysilane, n-propyltrimethoxysilane, n-propyltriethoxysilane, vinyltrimethoxysilane, vinyltriethoxysilane, phenyltrimethoxysilane, phenyltriethoxysilane, or a mixture thereof.

5. The mixture as claimed in claim 1, wherein the acid is hydrogen chloride.

6. The mixture as claimed in claim 1, wherein at least one aminoalkyl-functional alkoxysilane carries an aminoalkyl group selected from the group consisting of aminoethylaminopropyl, aminoethylaminoethylaminopropyl, N-methylaminopropyl, N-(n-butyl)aminopropyl, N-cyclohexylaminopropyl, and N-phenylaminopropyl, and at least one alkoxy group selected from the group consisting of methoxy, ethoxy, and propoxy.

7. The mixture as claimed in claim 1, wherein component (i) and component (ii) are used in a molar ratio of from 1:1 to 1:0.5.

8. The mixture as claimed in claim 1, wherein the hydrolysis and precondensation of (i) and (ii) are conducted in a solution diluted with alcohol.

9. The mixture as claimed in claim 1, wherein for the hydrolysis and precondensation from 0.7 to 1.6 mol of water is used per mole of silane of (i) and (ii).

10. The mixture as claimed in claim 1, wherein for the hydrolysis and precondensation a concentrated or aqueous hydrogen chloride solution is used in an amount of from 0.005 to 0.011% by weight HCl, based on the amount of (i) and (ii).

11. The mixture as claimed in claim 1, wherein the hydrolysis and precondensation are conducted under atmospheric pressure at a temperature of from 10 to 95° C.

12. The mixture as claimed in claim 1, wherein following hydrolysis and precondensation at a temperature in the range from 20 to 80° C. at least one aminoalkylalkoxysilane is added with further mixing to the reaction mixture and the reaction is allowed to continue for a period of from 5 minutes to 4 hours and then alcohol is removed by distillation at a temperature in the range from 40 to 120° C. under atmospheric pressure or under reduced pressure.

13. The mixture as claimed in claim 12, wherein the product obtained following distillative workup contains less than 5% by weight free alcohol.

14. The mixture as claimed in claim 1, wherein (i) and (ii) are subjected to the hydrolysis and precondensation.

15. A process for preparing a siloxane mixture as claimed in claim 1, comprising subjecting (i) at least one tetraalkoxysilane and (ii) at least one alkylalkoxysilane to controlled hydrolysis and precondensation by addition of water and acid, thereafter adding at least one aminoalkyl-functional alkoxysilane to the resulting siloxane reaction mixture, and removing alcohol from the reaction mixture.

16. An organic resin composition, comprising an organic resin and the siloxane mixture as claimed in claim 1.

17. A method of making the composition of claim 16, comprising incorporating the siloxane mixture into the organic resin.

18. A paint composition, comprising a paint and the siloxane mixture as claimed in claim 1.

19. A method of making the composition of claim 18, comprising incorporating the siloxane mixture into the paint.

20. A varnish composition comprising a varnish and the siloxane mixture as claimed in claim 1.

21. A method of making the composition of claim 20, comprising incorporating the siloxane mixture into the varnish.

22. A method of treating a mineral, organic, or metallic surface, comprising applying the siloxane mixture as claimed in claim 1 to the surface.

23. A method of hydrophobicizing a surface, comprising applying the siloxane mixture as claimed in claim 1 to the surface.

24. A method of surface-modifying a pulverulent substance, comprising treating the substance with the siloxane mixture as claimed in claim 1.

25. A method of silanizing fillers and pigments, comprising treating a filler or a pigment with the siloxane mixture as claimed in claim 1.

* * * * *